May 9, 1939. A. L. FREEDLANDER Re. 21,075

BELT

Original Filed July 13, 1931

INVENTOR
ABRAHAM L. FREEDLANDER.
BY Paulmier & Paulmier
ATTORNEYS

Reissued May 9, 1939

Re. 21,075

UNITED STATES PATENT OFFICE 21,075

BELT

Abraham L. Freedlander, Dayton, Ohio, assignor to The Dayton Rubber Manufacturing Company, Dayton, Ohio, a corporation of Ohio Original No. 2,016,140, dated October 1, 1935, Serial No. 725,397, May 12, 1934, which is a refile of abandoned application Serial No. 550,477, July 13, 1931. Application for reissue September 13, 1937, Serial No. 163,655

14 Claims. (Cl. 74—233)

My invention relates to belts.

It is the object of my invention to provide a belt having a compression section, a neutral axis section and a tension section with portions of the compression section removed to permit of the passage of the belt around pulleys of small diameter in use with short center drives, while, at the same time, employing, if desired, material normally difficult to compress, such as straight laid fabric.

Referring to the drawing.

Figure 1:
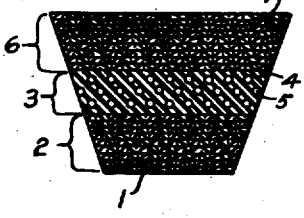
Figure 1 is a section through a typical belt.
Figure 2:
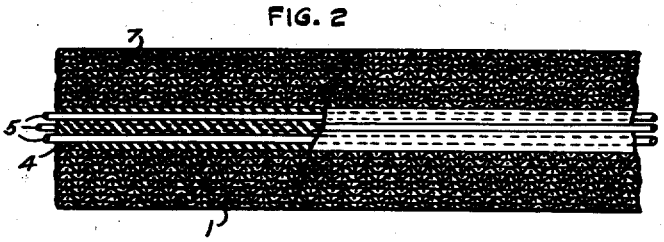
Figure 2 is a side elevation thereof partially in section.
Figure 3:
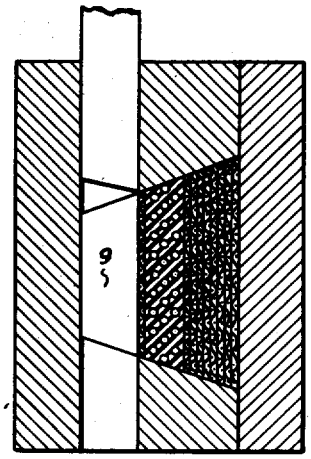
Figure 3 shows the belt having a portion sheared from the compression section to form a toothed inner wall.
Figure 4:
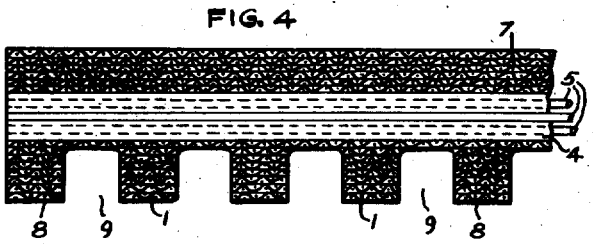
Figure 4 is a side elevation of the belt with the teeth formed on the inner wall.

Referring to the drawing in detail, I indicates one of the layers of straight laid fabric, of which there are a number to form the compression section 2. Mounted upon the compression section 2 is a neutral axis section 3 composed of the rubber 4 and the cords 5.

These cords are inextensible so that the belt has a fixed length.

Wrapped upon the exterior of the belt to form a tension section are a plurality of layers 7 of straight laid fabric or fabric laid on the bias.

Thereafter, the belt is cut to the proper trapezoidal section and vulcanized whereupon teeth are formed as at 8 in the compression section by shearing the sections 9 therefrom so that the belt can bend sufficiently to pass over pulleys of very small diameter and short section.

Figure 5:
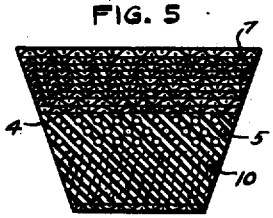
Figure 5 is a modification of the belt.
Figure 6:
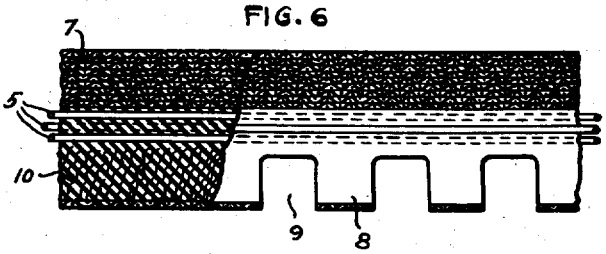
Figure 6 is a side elevation of the belt, partially in section, with some of the teeth cut away.

Referring to Figures 5 and 6, the compression section may be made with a combination of rubber and very fine, integrally mixed textile fibers 10. In such an event the belt is vulcanized and teeth are formed in the under surface as previously described.

It will be thus seen that it is the object of my invention to provide an integral structure having a central section, a neutral axis section and a tension section, which is completely manufactured and after which there is cut from the inner margin portions to form teeth.

The interstices between the teeth 8 terminate below the neutral axis section 3 and the portions of the compression section between each pair of teeth and above the interstices formed by the removal of sections 9, therefore, form cushioning means between the adjacent teeth themselves and between the teeth and neutral axis section or belt body proper. This cushioning means prevents the transmission to the neutral axis section, and belt body proper which comprises the integral neutral axis and tension sections, of destructive shocks and bending stresses caused by the occurrence of relative movement between the teeth and the neutral axis section, or belt body proper, when a given portion of the belt passes from a straight reach of its path into an arcuate reach, or vice versa. These resilient cushioning portions disposed above the interstices between adjacent teeth and between the teeth and the neutral axis section of the belt, as well as the belt body proper, thus absorb and dissipate or distribute destructive stresses caused by relative movement between the belt body and teeth.

It will, therefore, be seen that the provision, in a toothed belt, of this cushioning means relieves the neutral section and/or belt body proper from the setting up therein of injurious and destructive internal stresses, thus greatly increasing the life of the belt.

It will be understood that I desire to comprehend within my invention such modifications as may be necessary to adapt it to varying conditions and uses.

Having thus fully described my invention, what I claim as new and desire to secure by Letters Patent, is:

1. In a belt, independent tension, neutral axis and compression sections of rubber and textile material vulcanized together, said compression section comprising a continuous readily flexed portion immediately adjacent the neutral axis section, and toothed portions mounted on the continuous portion.

2. In combination in a belt, of a continuous rubber and textile section, an independent neutral axis section comprising continuous inextensible neutral axis rubberized cords, and a compression section comprising a resilient compression body portion immediately adjacent the neutral axis section having a plurality of teeth mounted thereon.

3. In combination in a belt, of a continuous rubber and textile tension section, an independent neutral axis section comprising continuous inextensible neutral axis rubberized cords, and a compression section comprising a resilient compression body portion immediately adjacent the neutral axis section having a plurality of teeth mounted thereon, said teeth comprising textile and rubber material.

4. In combination in a belt, of a tension section comprising a plurality of rubberized woven fabric layers, a neutral axis section comprising a plurality of layers of inextensible concentrically wound cords embedded in rubber, and a compression section comprising a continuous layer of fabric and rubber adjacent the inside of the neutral axis section, and teeth mounted thereon comprising a plurality of rubberized layers of fabric, said belt being characterized by the fact that the rubber and textile material are vulcanized to one another.

5. In combination in a belt, of a tension section of rubber and textile material, a neutral axis section of neutral axis cords embedded in rubber, and a compression section comprising a continuous resilient portion adjacent the neutral axis section, and a plurality of teeth mounted thereon, said compression section being composed of a plurality of layers of textile material embedded in rubber.

6. In combination in a belt, of a tension section comprising a plurality of rubberized fabric layers, a neutral axis section comprising a plurality of inextensible neutral axis cords arranged in parallelism concentrically and embedded in rubber, and a compression section consisting of a continuous readily flexed portion having a plurality of teeth mounted thereon, said teeth and continuous portion comprising rubber and a textile reinforcement.

7. In a belt, independent tension, neutral axis and compression sections vulcanized together, said tension and neutral axis sections being formed of rubber and textile material and said compression section being formed of rubber mixed with textile material and having teeth formed therein with the interstices therebetween terminating below the top of said compression section to form resilient cushioning portions between adjacent teeth and the section thereabove.

8. In combination in a belt, of a continuous rubber and textile tension section, a compression section of rubber mixed with textile material, and having teeth formed therein with the interstices therebetween extending partway therethrough, and an intermediate substantially inextensible section between said tension and compression sections and comprising rubber with neutral axis means therein.

9. In combination in a belt, of a continuous rubber and textile tension section, a compression section of rubber mixed with textile fiber, and having teeth formed therein with the interstices therebetween extending partway therethrough, and an intermediate substantially inextensible section between said tension and compression sections and comprising rubber with neutral axis means therein, the portions of said compression section above the interstices between the teeth being adapted to provide a resilient cushioning means between adjacent teeth and the intermediate section.

10. In a belt, tension, neutral axis and compression sections vulcanized together, said tension and compression sections being formed of layers of square woven rubberized fabric, said neutral axis section being formed of rubber having neutral axis means therein, and said compression section having teeth formed therein with interstices therebetween extending partially through said compression section.

11. In a belt, independent tension, neutral axis and compression sections vulcanized together, said tension section comprising square woven rubberized fabric, said neutral axis section comprising rubber having neutral axis reinforcing means therein, and said compression section comprising a body of rubber and having teeth formed therein with the interstices therebetween terminating below the top of said compression section, whereby to form resilient cushioning portions of rubber between adjacent teeth and the neutral axis section.

12. In a belt, tension, neutral axis and compression sections of rubber and square woven textile material vulcanized together, said compression section having teeth formed therein with interstices therebetween spaced from the neutral axis and tension sections which make up the body proper of the belt by portions of the body material of the resilient compression section.

13. In a belt, tension, intermediate and compression sections of rubber and textile material vulcanized together, the textile material of said compression section being square woven and bias-laid and said compression section having teeth formed therein with the intermediate interstices terminating below the top of said compression section to form resilient cushioning means of bias-laid textile material between adjacent teeth and the neutral axis and tension sections which make up the body proper of the belt.

14. In a belt, tension, intermediate and compression sections of rubber and textile material vulcanized together, the textile material of said tension section being square woven and straight-laid and the textile material of said compression section being square woven and bias-laid, said compression section having teeth formed therein with the intermediate interstices terminating below the top of said compression section to form resilient cushioning means of bias-laid textile material between adjacent teeth and the neutral axis and tension sections which make up the body proper of the belt.

ABRAHAM L. FREEDLANDER.